(12) United States Patent
Hatano et al.

(10) Patent No.: US 12,088,978 B2
(45) Date of Patent: Sep. 10, 2024

(54) COMMUNICATION SYSTEM AND ONU SYSTEM

(71) Applicant: NIPPON TELEGRAPH AND TELEPHONE CORPORATION, Tokyo (JP)

(72) Inventors: Tomoya Hatano, Musashino (JP); Keita Takahashi, Musashino (JP); Naotaka Shibata, Musashino (JP); Hiroko Nomura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 67 days.

(21) Appl. No.: 17/911,736

(22) PCT Filed: Mar. 19, 2020

(86) PCT No.: PCT/JP2020/012453
§ 371 (c)(1),
(2) Date: Sep. 15, 2022

(87) PCT Pub. No.: WO2021/186714
PCT Pub. Date: Sep. 23, 2021

(65) Prior Publication Data
US 2023/0133100 A1 May 4, 2023

(51) Int. Cl.
*H04Q 11/00* (2006.01)
*H04B 10/61* (2013.01)

(52) U.S. Cl.
CPC ....... *H04Q 11/0067* (2013.01); *H04B 10/614* (2013.01); *H04Q 2011/0079* (2013.01)

(58) Field of Classification Search
None
See application file for complete search history.

(56) References Cited

U.S. PATENT DOCUMENTS

| 5,920,410 A | * | 7/1999 | Smith | ........ H04Q 11/0062 398/4 |
| 2002/0109876 A1 | * | 8/2002 | Eijk | ........ H04Q 11/0066 398/58 |

(Continued)

FOREIGN PATENT DOCUMENTS

JP 201776945 A 4/2017

OTHER PUBLICATIONS

Basic Technology Course GE-PON Technology, 1st What is Pon?, NTT Technical Journal, vol. 17, No. 8, 2005, pp. 71-74, https://www.ntt.co.jp/journal/0508/files/jn200508071.pdf.

*Primary Examiner* — Darren E Wolf
(74) *Attorney, Agent, or Firm* — Harness, Dickey & Pierce, P.L.C.

(57) ABSTRACT

One aspect of the present invention is a communication system for a passive optical network that includes: an OLT system including a first OLT (Optical Line Terminal), a second OLT, and an OLT control apparatus that controls the first OLT and the second OLT; a plurality of splitters that are connected between the first OLT and the second OLT using optical communication channels; and ONU systems that are connected to the respective splitters using optical communication channels, and each include a first session establishing unit that establishes a session with the first OLT, a second session establishing unit that establishes a session with the second OLT, and a signal processing unit that executes signal processing of an ONU (Optical Network Unit) based on an optical signal output from the first session establishing unit or the second session establishing unit.

10 Claims, 6 Drawing Sheets

(56) References Cited

U.S. PATENT DOCUMENTS

| | | | | |
|---|---|---|---|---|
| 2006/0104638 A1* | 5/2006 | Chung | ................ | H04J 14/0226 398/71 |
| 2006/0222364 A1* | 10/2006 | Chung | ................ | H04J 14/0246 398/72 |
| 2007/0092256 A1* | 4/2007 | Nozue | ................ | H04J 14/0246 398/72 |
| 2007/0237177 A1* | 10/2007 | Endo | ................. | H04Q 11/0071 370/468 |
| 2011/0268435 A1* | 11/2011 | Mizutani | ........... | H04Q 11/0067 398/5 |
| 2013/0004174 A1* | 1/2013 | Lee | ..................... | H04B 10/272 398/79 |
| 2013/0045010 A1* | 2/2013 | Mukai | .................. | H04J 3/0688 398/52 |
| 2020/0343975 A1* | 10/2020 | Deng | ................ | H04Q 11/0067 |

* cited by examiner

COMMUNICATION SYSTEM AND ONU SYSTEM

CROSS-REFERENCE TO RELATED APPLICATIONS

This application is a 371 U.S. National Phase of International Application No. PCT/JP2020/012453, filed on Mar. 19, 2020. The entire disclosure of the above application is incorporated herein by reference.

TECHNICAL FIELD

The present invention relates to a communication system technology and an ONU system technology.

BACKGROUND ART

In a service for providing optical access, economical servicing is realized by using a passive optical network (PON) in which a terminal office apparatus and a plurality of terminal apparatuses are connected (refer to NPL 1, for example). The PON is a point-to-multipoint network in which a central office provides services to a large number of subscribers. For example, in the PON, a downstream optical signal from a central office is branched by an optical coupler connected to one trunk line fiber, and is distributed to a plurality of subscribers. In the PON, an ONU (Optical Network Unit) on a downstream side and an OLT (Optical Line Terminal) on a host side are used.

CITATION LIST

Non Patent Literature

[NPL 1] "Technology Basic Course GE-OPON Technology", [online], NTT GIJUTU Journal, 2005.8 p. 71 to 74, [Retrieved on Feb. 28, 2020], Internet "https://www.ntt.co.jp/journal/0508/files/jn200508071.pdf"

SUMMARY OF THE INVENTION

Technical Problem

However, there is a problem in that, in a known PON, it is difficult to maintain communication when a problem such as a facility failure occurs.

The present invention has been made in view of the problem described above, and an object of the present invention is to provide a technique for improving the likelihood of maintaining communication even in a case where a problem occurs in the PON.

Means for Solving the Problem

One aspect of the present invention is a communication system for a passive optical network that includes: an OLT system including a first OLT (Optical Line Terminal), a second OLT, and an OLT control apparatus that controls the first OLT and the second OLT; a plurality of splitters that are connected between the first OLT and the second OLT using optical communication channels; and ONU systems that are connected to the respective splitters using optical communication channels, and each include a first session establishing unit that establishes a session with the first OLT, a second session establishing unit that establishes a session with the second OLT, and a signal processing unit that executes signal processing of an ONU (Optical Network Unit) based on an optical signal output from the first session establishing unit or the second session establishing unit.

One aspect of the present invention is an ONU system that includes: a first session establishing unit that i connected to an OLT system including a first OLT (Optical Line Terminal), a second OLT, and an OLT control apparatus that controls the first OLT and the second OLT, via a splitter using optical communication channels, and is configured to establish a session with the first OLT; a second session establishing unit that is connected to the OLT system via the splitter using optical communication channels, and is configured to establish a session with the second OLT; and a signal processing unit configured to execute signal processing of an ONU (Optical Network Unit) based on an optical signal output from the first session establishing unit or the second session establishing unit.

Effects of the Invention

According to the present invention, even if a problem occurs in the PON, the likelihood of maintaining communication can be increased.

DESCRIPTION OF EMBODIMENTS

An embodiment of the present invention will be described in detail with reference to the drawings.

Figure 1:
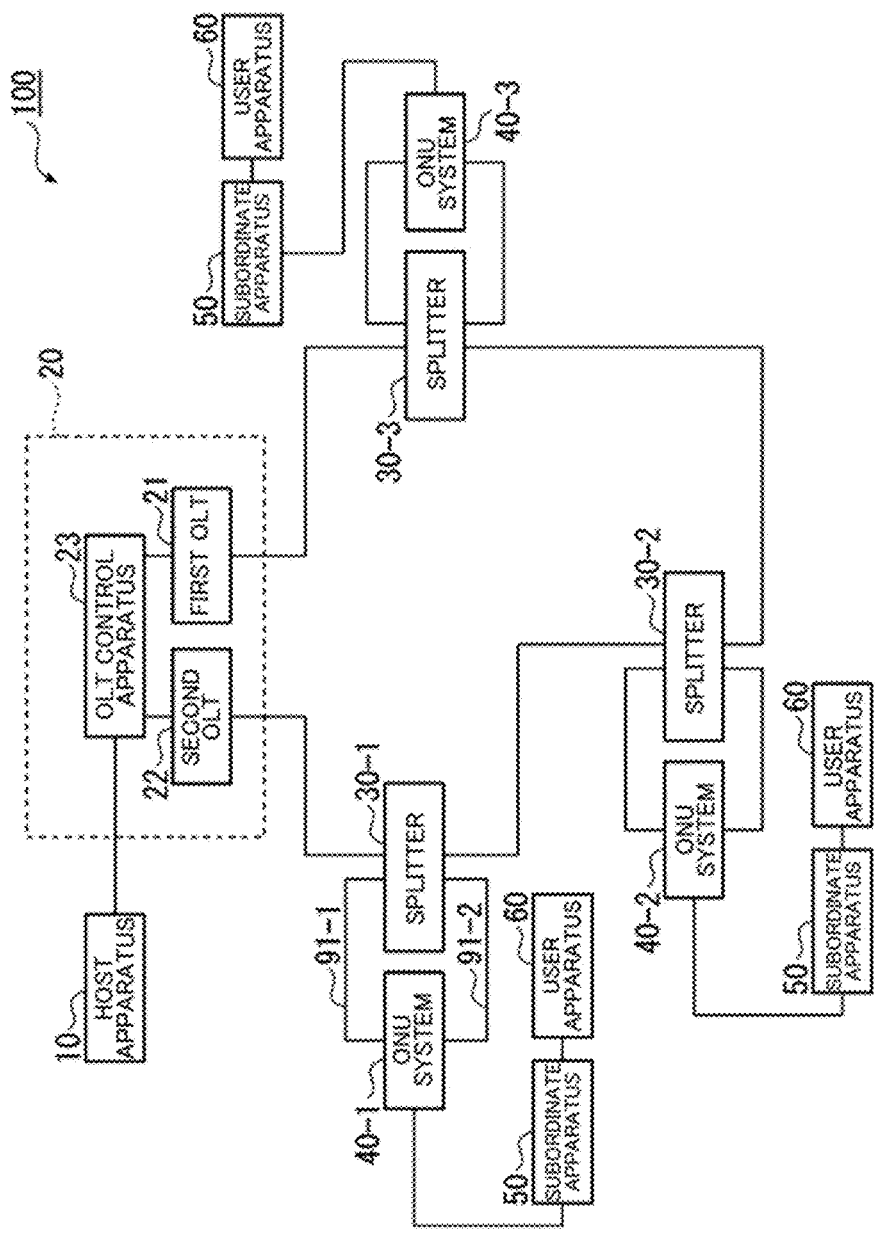
FIG. 1 is a diagram illustrating an exemplary system configuration of a communication system 100 of the present invention.

FIG. 1 is a diagram illustrating an exemplary system configuration of a communication system 100 of the present invention. The communication system 100 includes a host apparatus 10, an OLT system 20, a plurality of splitters 30, a plurality of ONU systems 40, subordinate apparatuses 50, and user apparatuses 60. The host apparatus 10 is connected to a host network of the communication system 100. In FIG. 1, three splitters 30 and three ONU systems 40 are illustrated, but the number "three" is merely a specific example. That is, the number of the splitters 30 and the ONU systems 40 need only be two or more.

The OLT system 20 is installed so as to be able to communicate with the host apparatus 10. The OLT system 20 functions as an OLT in the PON. The splitters 30 each receive an input of an optical signal, and output the optical signal to a plurality of paths. The splitters 30 are each configured using an optical splitter with two inputs and two outputs, for example.

The ONU systems 40 are communicably connected to respective subordinate apparatuses 50. Each subordinate apparatus 50 is communicably connected to one or more user apparatuses 60. In the following, each apparatus will be described in detail. Note that, for the sake of description, the host apparatus 10, the subordinate apparatuses 50, and the user apparatuses 60 will be described prior to the description of the OLT system 20, the splitters 30, and the ONU systems 40.

The host apparatus 10 is communicably connected to a plurality of subordinate apparatuses 50 via the OLT system 20, the splitters 30 and the ONU systems 40. The host apparatus 10 is an apparatus that realizes a predetermined function by performing communication with the plurality of subordinate apparatuses 50. The host apparatus 10 is a base band unit (BBU) in a mobile network, for example. The host apparatus 10 may also be a communication device that constitutes a relay network, for example.

Each subordinate apparatus 50 is an apparatus that realizes a predetermined function by performing communication with the host apparatus 10. The subordinate apparatus 50 is an apparatus that is installed at a position closer to a user side than the host apparatus 10 is. For example, when the host apparatus 10 is a BBU, the subordinate apparatus 50 is a remote radio head (RRH) in a mobile network. In this case, the communication channel between the subordinate apparatus 50 and the corresponding user apparatus 60 is an access section of the mobile network. On the other hand, when the host apparatus 10 is a communication device that constitutes a relay network, the subordinate apparatus 50 may also be an apparatus such as a set-top box. In this case, the communication channel between the subordinate apparatus 50 and the corresponding user apparatus 60 may also be a network such as a home network. The subordinate apparatus 50 houses one or more user apparatuses 60, for example. Note that the configuration may also be such that the user apparatus 60 is connected to an ONU system 40 without the subordinate apparatus 50 mediating communication.

Each user apparatus 60 is an apparatus that is communicably connected to other apparatuses as a result of being connected to a subordinate apparatus 50 via a communication channel. The user apparatus 60 is an information processing apparatus such as a smartphone, a tablet, or a personal computer, for example. The user apparatus 60 may also be a sensor in IoT (Internet of Things), for example. The user apparatus 60 may also be an apparatus for business use such as an ATM (Automatic Teller Machine), a vending machine, or a POS (Point Of Sale) terminal, for example.

Figure 2:
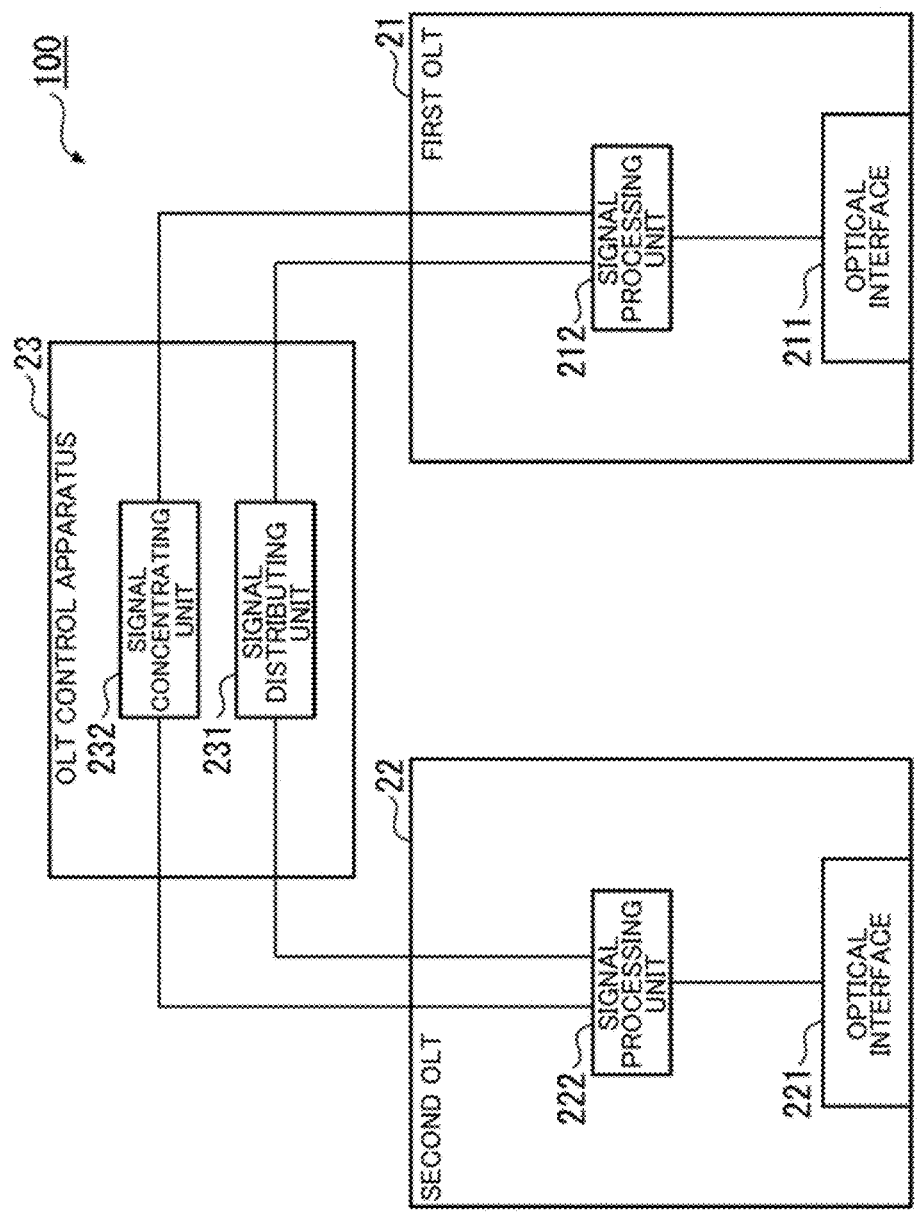
FIG. 2 is a diagram illustrating an exemplary configuration of an OLT system 20.

Next, the OLT system 20 will be described. FIG. 2 is a diagram illustrating an exemplary configuration of the OLT system 20. The OLT system 20 includes a first OLT 21, a second OLT 22, and an OLT control apparatus 23. The first OLT 21 and the second OLT 22 are each an apparatus that provides an OLT function in a known PON. That is, the OLT system 20 includes at least two apparatuses that provide an OLT function. The first OLT 21 and the second OLT 22 may be configured as independent apparatuses that have separate casings, or may be configured as a board or a chip. In any cases, the first OLT 21 and the second OLT 22 may also be configured as software. The basic configurations of the first OLT 21 and the second OLT 22 are the same, therefore in the following, the first OLT 21 will be described as a representative apparatus.

The first OLT 21 includes an optical interface 211 and a signal processing unit 212. The optical interface 211 outputs an optical signal generated by the signal processing unit 212 to a communication channel. The optical interface 211 transmits an optical signal to the ONU systems 40 via the splitters 30. Optical signals addressed to a plurality of ONU systems 40 may be superimposed on the optical signal transmitted from the optical interface 211. Also, the optical interface 211 receives an optical signal from the communication channel, and outputs the received optical signal to the signal processing unit 212. The optical interface 211 receives optical signals from the ONU systems 40 via the splitters 30. Optical signals transmitted from a plurality of ONU systems 40 may be superimposed on the optical signal received by the optical interface 211.

The signal processing unit 212 functions as a known OLT. In the following, an example of processing to be performed by this signal processing unit 212 will be described. The signal processing unit 212 converts an electric signal transmitted from the host apparatus 10 to a subordinate apparatus 50 to an optical signal, and outputs the optical signal to the optical interface 211. The signal processing unit 212 may also superimpose (multiplex) optical signals addressed to a plurality of subordinate apparatuses 50. The signal processing unit 212 converts an optical signal received by the optical interface 211 to an electric signal, and outputs the electric signal to the host apparatus 10, which is the destination, via the OLT control apparatus 23.

The optical interface 211 and the signal processing unit 212 in the first OLT 21 respectively correspond to an optical interface 221 and a signal processing unit 222 in the second OLT 22.

The OLT control apparatus 23 includes a signal distributing unit 231 and a signal concentrating unit 232. The signal distributing unit 231 outputs downstream signals (signals transmitted to ONU systems 40) output from the host apparatus 10 to both of the first OLT 21 and second OLT 22. The signal concentrating unit 232 outputs upstream signals (signals received from ONU systems 40) that are output from both of the first OLT 21 and second OLT 22 to the host apparatus 10.

Figure 3:
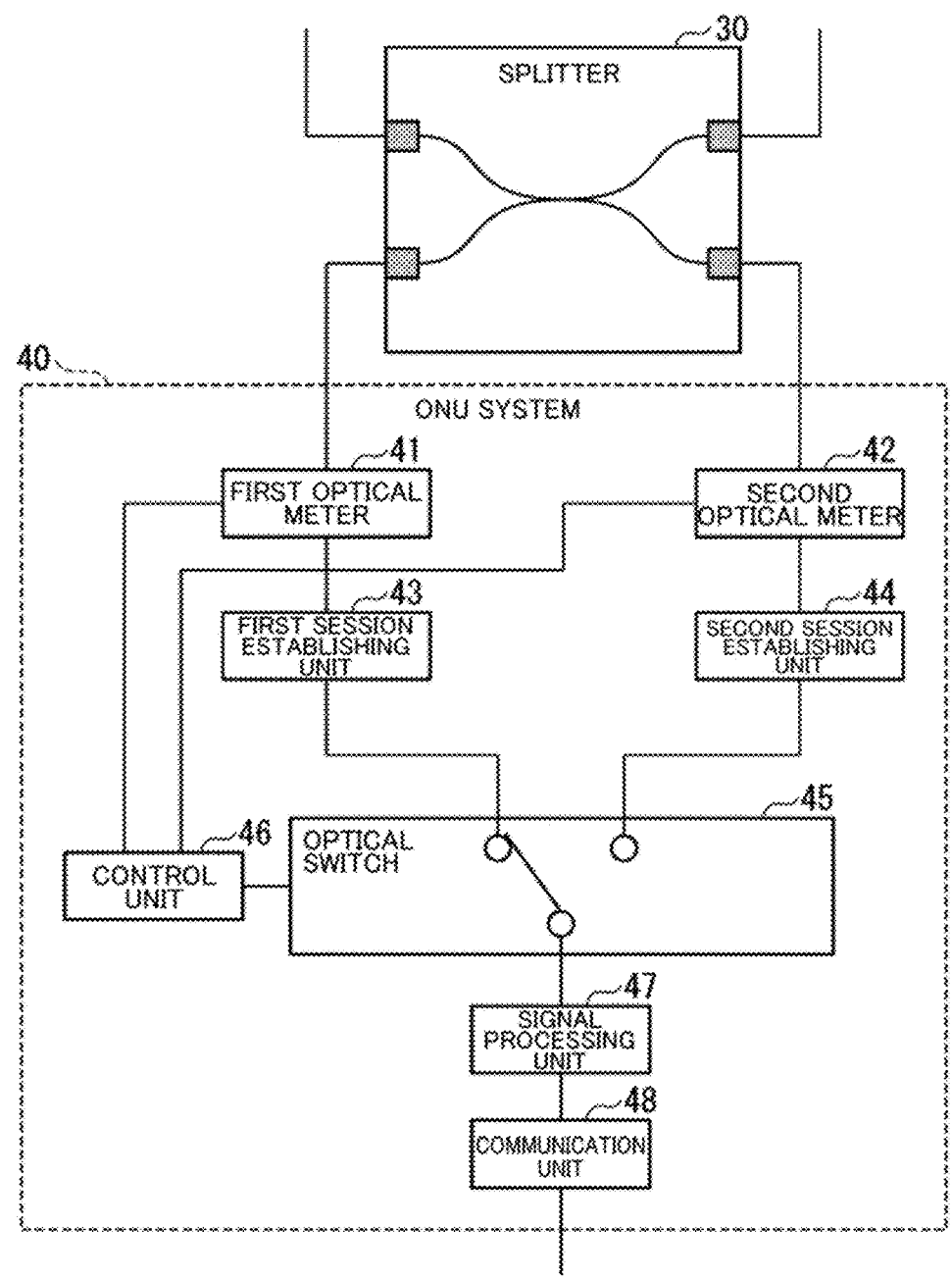
FIG. 3 is a diagram illustrating a first exemplary configuration of a splitter 30 and an ONU system 40.

FIG. 3 is a diagram illustrating a first exemplary configuration of each splitter 30 and ONU system 40. The splitter 30 is constituted by using an optical signal splitter with two inputs and two outputs. The splitter 30 distributes and outputs an optical signal input from a communication channel (hereinafter, referred to as a "trunk communication channel") that connects the OLT system 20 and the splitters 30, and is formed in a ring shape, to a downstream apparatus and the ONU system 40 connected to the splitter 30. The ratio of distribution, here, may be an equal ratio (50:50), or may also be an unequal ratio (i.e., 40:60).

The downstream apparatus is an apparatus, out of two apparatuses connected to one splitter 30 via the trunk communication channel, that is different from the apparatus that outputs an optical signal to be input to the one splitter 30. For example, in FIG. 1, when a splitter 30-1 is taken as a reference, in the case where an optical signal input from the OLT system 20 is to be distributed, the downstream apparatus is a splitter 30-2. For example, in FIG. 1, when the splitter 30-2 is taken as a reference, in the case where an optical signal input from the splitter 30-1 is to be distributed, the downstream apparatus is a splitter 30-3. For example, in FIG. 1, when the splitter 30-2 is taken as a reference, in the case where an optical signal input from the splitter 30-3 is to be distributed, the downstream apparatus is the splitter 30-1.

Also, each splitter 30 outputs an optical signal to be output to the ONU system 40 connected to the splitter 30, to the ONU system 40 through a communication channel that differs depending on the port to which the optical signal has been input. For example, the splitter 30 outputs an optical signal input through an upper left port in FIG. 3 to an upper right port and a lower right port. Therefore, when the splitter 30-1 in FIG. 1 is described as an example, an optical signal input from the first OLT 21 is output to a path 91-2 and the splitter 30-2. The optical signal output to the path 91-2 is input to an ONU system 40-1. Also, the splitter 30 outputs an optical signal input through an upper right port in FIG. 3 to an upper left port and a lower left port, for example. Therefore, when the splitter 30-1 in FIG. 1 is described as an example, an optical signal input from the splitter 30-2 is output to a path 91-1 and the first OLT 21. The optical signal output to the path 91-1 is input to the ONU system 40-1. Note that the path 91-1 and the path 91-2 are connected to different optical meters. For example, the path 91-1 is connected to a first optical meter 41, and the path 91-2 is connected to a second optical meter 42.

Each ONU system 40 includes a first optical meter 41, a second optical meter 42, a first session establishing unit 43, a second session establishing unit 44, an optical switch 45, a control unit 46, a signal processing unit 47, and a communication unit 48. The first optical meter 41 receives an optical signal output from the connected splitter 30. The first optical meter 41 outputs information indicating the light intensity of the received optical signal to the control unit 46. The first optical meter 41 outputs the received optical signal to the first session establishing unit 43. The second optical meter 42 receives an optical signal output from the splitter 30. The second optical meter 42 outputs information indicating the light intensity of the received optical signal to the control unit 46. The second optical meter 42 outputs the received optical signal to the second session establishing unit 44.

The first session establishing unit 43 establishes a session with the OLT system 20. Specifically, the first session establishing unit 43 establishes a session with the first OLT 21 of the OLT system 20. The first session establishing unit 43 may include a PHY (physical interface) and MAC (Medium Access Control), for example. The first session establishing unit 43 outputs an optical signal received from the first OLT 21 to the optical switch 45.

The second session establishing unit 44 establishes a session with the OLT system 20. Specifically, the second session establishing unit 44 establishes a session with the second OLT 22 of the OLT system 20. The second session establishing unit 44 may include a PHY (physical interface) and MAC (Medium Access Control), for example. The second session establishing unit 44 outputs an optical signal received from the second OLT 22 to the optical switch 45.

The optical switch 45 outputs one of the optical signal output from the first session establishing unit 43 and the optical signal output from the second session establishing unit 44 to the signal processing unit 47, in accordance with the control of the control unit 46. The optical switch 45 outputs the optical signal output from the signal processing unit 47 to the splitter 30 via one of the first session establishing unit 43 and the second session establishing unit 44, in accordance with the control of the control unit 46.

The control unit 46 receives light intensity information from each of the first optical meter 41 and the second optical meter 42, and selects one of them in accordance with a predetermined criterion. The control unit 46 controls the optical switch 45 such that the selected optical signal is output to the signal processing unit 47. The predetermined criterion for selection is higher reliability, for example. The level of reliability may be determined based on the light intensity of the optical signal. For example, the control unit 46 may select an optical signal with higher light intensity.

The control unit 46 determines the OLT to which the ONU system 40 thereof belongs. The control unit 46 may determine the OLT (first OLT 21 or second OLT 22) to which the ONU system 40 thereof belongs, according to the selected optical meter (first optical meter 41 or second optical meter 42), for example. For example, when the first optical meter 41 is selected, it may be determined that the ONU system 40 belongs to the first OLT 21. If the received optical signal includes transmission source information (information indicating the transmission source OLT), the control unit 46 may also determine the OLT to which the ONU system 40 thereof belongs based on the transmission source information. The control unit 46 notifies the OLT system 20 of information indicating the OLT to which the ONU system 40 thereof belongs. A portion or the entirety of the operations of the control unit 46 may be realized using hardware including an electronic circuit in which an LSI (Large Scale Integration circuit), an ASIC (Application Specific Integrated Circuit), a PLD (Programmable Logic Device), an FPGA (Field Programmable Gate Array), or the like is used.

The signal processing unit 47 functions as an ONU in a known PON. In the following, an example of the processing of this signal processing unit 47 will be described. The signal processing unit 47 converts an optical signal indicating a signal transmitted from the host apparatus 10 to the connected subordinate apparatus 50, to an electric signal, and outputs the electric signal to the communication unit 48. Here, if optical signals addressed to a plurality of subordinate apparatuses 50 are superimposed (multiplexed), the signal processing unit 47 takes out an optical signal addressed to the subordinate apparatus 50 connected to the ONU system 40 of the signal processing unit 47, and converts the taken out optical signal to an electric signal. The signal processing unit 47 converts an electric signal received by the communication unit 48 to an optical signal, and outputs the optical signal to the optical switch 45.

The communication unit 48 is a communication interface for communication with the subordinate apparatus 50.

Figure 4:
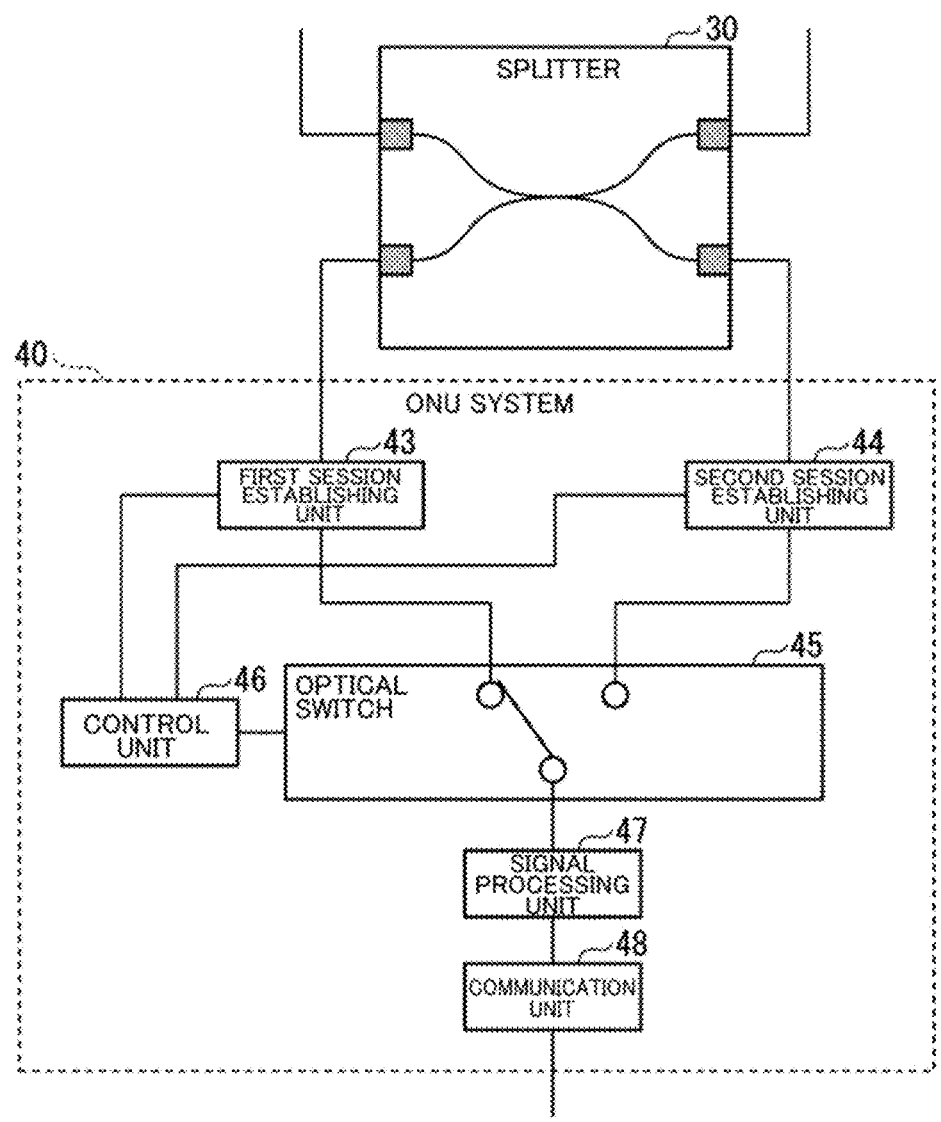
FIG. 4 is a diagram illustrating a second exemplary configuration of the splitter 30 and the ONU system 40.

FIG. 4 is a diagram illustrating a second exemplary configuration of each splitter 30 and ONU system 40. In the following, the second exemplary configuration will be described focusing on the differences from the first exemplary configuration. The configuration of the splitter 30 is the same between the first exemplary configuration and the second exemplary configuration. Note that the path 91-1 and the path 91-2 are connected to different session establishing units, instead of the optical meters. For example, the path 91-1 is connected to the first session establishing unit 43, and the path 91-2 is connected to the second session establishing unit 44.

Each ONU system 40 includes a first session establishing unit 43, a second session establishing unit 44, an optical switch 45, a control unit 46, a signal processing unit 47, and a communication unit 48. Among these constituent elements, the configurations of the optical switch 45, the signal processing unit 47, and the communication unit 48 are similar to those of the first exemplary configuration.

The first session establishing unit 43 receives an optical signal output from the connected splitter 30. The first session establishing unit 43 establishes a session with the OLT system 20. Specifically, the first session establishing unit 43 establishes a session with the first OLT 21 of the OLT system 20. The first session establishing unit 43 may include a PHY and MAC, for example. The first session establishing unit 43 outputs the optical signal received from the first OLT 21 to the optical switch 45.

The first session establishing unit 43 acquires delay information regarding communication with the first OLT 21, which is a communication partner apparatus, based on the optical signal received from the connected splitter 30. The delay information is information indicating the length of delay that is occurring in the communication. The delay information may be acquired by an MPCP (Multi-Point Control Protocol) function in MAC, for example. The first session establishing unit 43 outputs the acquired delay information to the control unit 46.

The second session establishing unit 44 receives an optical signal output from the connected splitter 30. The second session establishing unit 44 establishes a session with the OLT system 20. Specifically, the second session establishing unit 44 establishes a session with the second OLT 22 of the OLT system 20. The second session establishing unit 44 may include a PHY and MAC, for example. The second session establishing unit 44 outputs the optical signal received from the second OLT 22 to the optical switch 45.

The second session establishing unit 44 acquires delay information regarding communication with the second OLT 22, which is a communication partner apparatus, based on the optical signal received from the connected splitter 30. The second session establishing unit 44 outputs the acquired delay information to the control unit 46.

The control unit 46 receives delay information from each of the first session establishing unit 43 and the second session establishing unit 44, and selects one of the optical signals, in accordance with a predetermined criterion. The control unit 46 controls the optical switch 45 such that the selected optical signal is output to the signal processing unit 47. The predetermined criterion for selection is higher reliability, for example. The level of reliability may be determined based on the length of delay time. For example, the control unit 46 may select an optical signal with shorter delay time.

The control unit 46 determines the OLT to which the ONU system 40 thereof belongs. The control unit 46 may determine the OLT (first OLT 21 or second OLT 22) to which the ONU system 40 thereof belongs, according to the selected session establishing unit, for example. For example, when the first session establishing unit 43 is selected, it may be determined that the ONU system 40 belongs to the first OLT 21. If the received optical signal includes transmission source information (information indicating the transmission source OLT), the control unit 46 may also determine the OLT to which the ONU system 40 thereof belongs based on the transmission source information. The control unit 46 notifies the OLT system 20 of information indicating the OLT to which the ONU system 40 thereof belongs. A portion or the entirety of the operations of the control unit 46 may be realized using hardware including an electronic circuit in which an LSI, an ASIC, a PLD, an FPGA, or the like is used.

Figure 5:
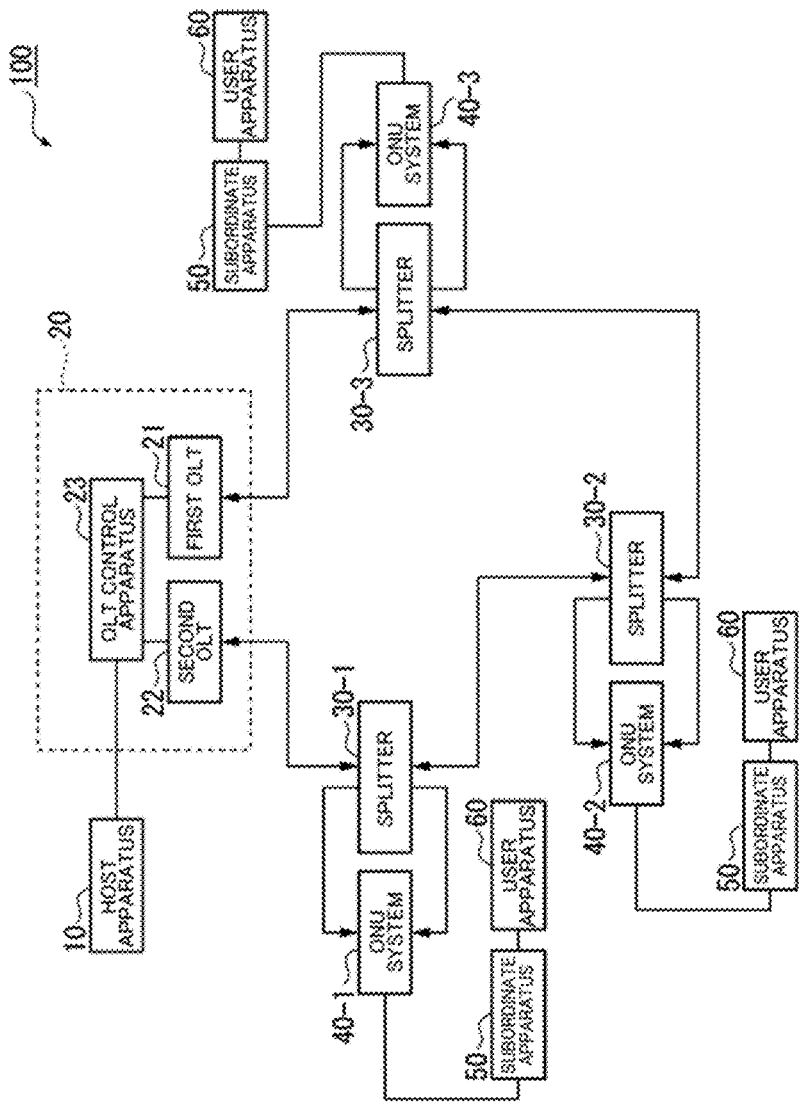
FIG. 5 is a diagram illustrating a specific example of operations of the communication system 100 at a time of normal communication.

FIG. 5 is a diagram illustrating a specific example of operations of the communication system 100 at a time of normal communication. The arrows shown in FIG. 5 indicate the flow of a downstream signal (signal flowing from the host apparatus 10 to a subordinate apparatus 50). As shown in FIG. 5, in the communication system 100, a downstream signal is transmitted from both of the first OLT 21 and the second OLT 22. Therefore, the downstream signal can be transmitted through both of a clockwise path and a counterclockwise path. For example, the downstream signal transmitted from the first OLT 21 is transmitted through the clockwise path, and the downstream signal transmitted from the second OLT 22 is transmitted through the counterclockwise path.

In the example in FIG. 4, a problem does not occur in the communication system 100, in particular. Therefore, the downstream signal transmitted from the first OLT 21 and the downstream signal transmitted from the second OLT 22 are both transmitted through all of the splitters 30. As a result, an optical signal transmitted through the trunk communication channel in a clockwise direction, and an optical signal transmitted through the trunk communication channel in a counterclockwise direction reach each of the ONU systems 40. Each ONU system 40 selects one of the optical signals in accordance with a predetermined criteria (light intensity or delay information), and uses the selected optical signal for processing.

Figure 6:
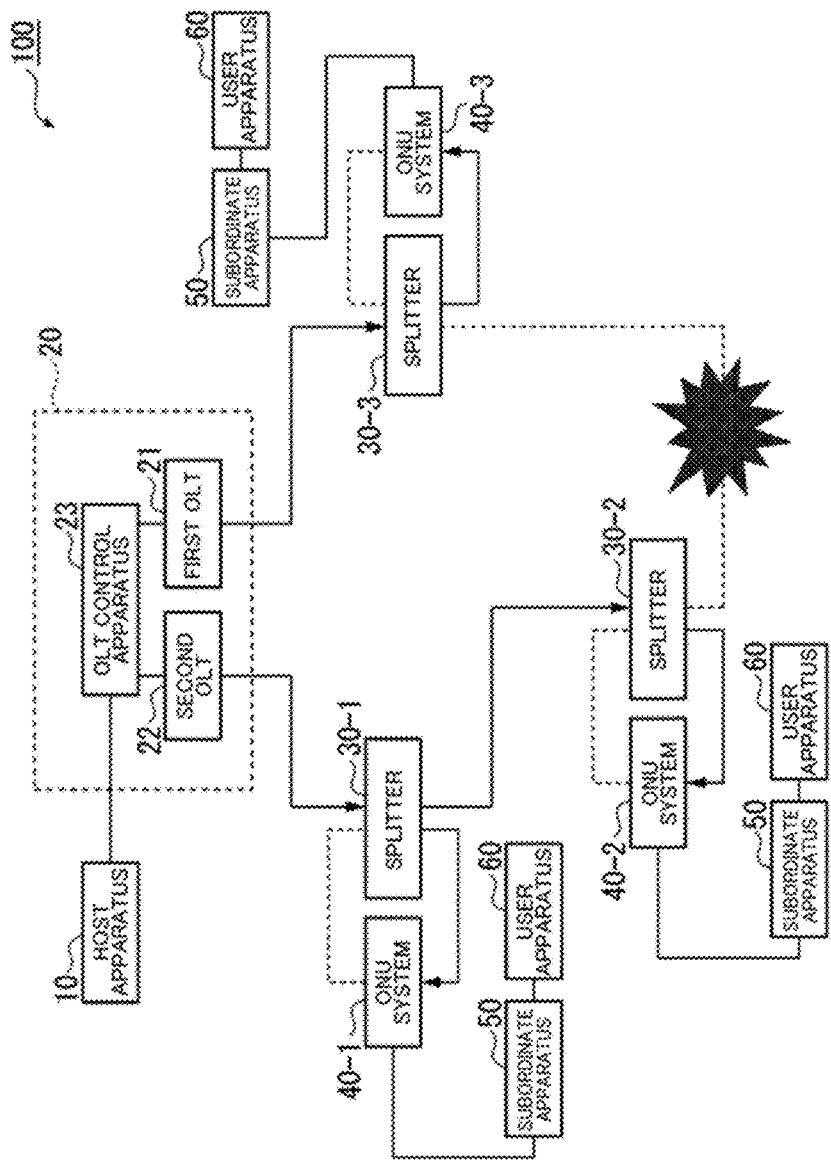
FIG. 6 is a diagram illustrating a specific example of operations of communication system 100 at a time of troubled communication.

FIG. 6 is a diagram illustrating a specific example of operations of the communication system 100 at a time of troubled communication. In FIG. 6, the communication channel shown by a broken line, out of the two communication channels extending from a splitter 30 to the connected ONU systems 40, indicates a communication channel through which the optical signal (downstream signal) transmitted from the OLT system 20 does not pass. The communication channels shown by solid lines with arrows indicate communication channels through which the optical signal (downstream signal) transmitted from the OLT system 20 passes.

In the example in FIG. 6, a problem occurs in a communication channel between the splitter 30-2 and the splitter 30-3. Therefore, a downstream signal output from the splitter 30-2 does not reach the splitter 30-3. Similarly, a downstream signal output from the splitter 30-3 does not reach the splitter 30-2.

The splitter 30-2 cannot receive an optical signal (downstream signal of first OLT 21) transmitted in the clockwise direction due to the occurrence of a problem, but can receive an optical signal (downstream signal of second OLT 22) transmitted in the counterclockwise direction. An ONU system 40-2 receives the optical signal transmitted in the counterclockwise direction via the splitter 30-2.

The splitter 30-3 cannot receive an optical signal (downstream signal of second OLT 22) transmitted in the counterclockwise direction due to the occurrence of the problem, but can receive an optical signal (downstream signal of first OLT 21) transmitted in the clockwise direction. An ONU system 40-3 receives the optical signal transmitted in the clockwise direction via the splitter 30-3.

If the belonging OLT (first OLT 21 or second OLT 22) before the occurrence of a problem is the same as the OLT with which communication is possible after the occurrence of the problem, each ONU system 40 continues the communication, as is. If the belonging OLT (first OLT 21 or second OLT 22) before the occurrence of a problem differs from the OLT with which communication is possible after the occurrence of the problem, each ONU system 40 performs switching of the optical switch 45 in accordance with the control of the control unit 46. Note that a session has been established, in advance, with the OLT with which communication is performed after switching, by the session establishing unit (first session establishing unit 43 or second session establishing unit 44). Therefore, the time required for switching can be kept short.

As a result of the operations described above, all of the ONU systems (ONU system 40-1, ONU system 40-2, and ONU system 40-3) can receive the downstream signal from the OLT system 20 and can maintain communication, regardless of the occurrence of a problem.

The flow of a downstream signal has been described. An upstream signal is transmitted to the OLT system 20 from each ONU system 40 as a result of a signal flowing through solid line paths in the drawings described above in a direction opposite to the arrow direction. Also, in FIGS. 5 and 6, the arrows between the splitters 30 and the connected ONU systems 40 each indicate single direction, and these arrows indicate the flow direction of a downstream signal. In the case of an upstream signal, the signal is transmitted using the paths selected by the optical switches 45.

In the communication system 100 configured as described above, the OLT system 20 is provided with a plurality of (e.g., two) OLT functions. Even if a problem occurs in a communication channel or the like, the likelihood that the ONU systems 40 can each receive an optical signal from one of the OLTs increases. Therefore, even if a problem occurs in the PON, the likelihood of being able to maintain communication can be increased.

(Modifications)

In the OLT system 20, the OLT control apparatus may also be configured as a functional unit in one of or both of the first OLT 21 and the second OLT 22.

In each ONU system 40, the first optical meter 41, the second optical meter 42, the first session establishing unit 43, the second session establishing unit 44, the optical switch 45, the control unit 46, the signal processing unit 47, and the communication unit 48 may be housed in one casing and configured as one apparatus, or housed in a plurality of casings and configured as separate apparatuses.

Although an embodiment of the present invention have been described with reference to the drawings, the specific configuration is not limited to the embodiment, and designs or the like that do not depart from the gist of the invention are intended to be within the scope of the invention.

INDUSTRIAL APPLICABILITY

The present invention can be applied to a system for performing communication using the PON.

REFERENCE SIGNS LIST

100 Communication system
10 Host apparatus
20 OLT system
21 First OLT
22 Second OLT
23 OLT control apparatus
30 Splitter
40 ONU system
50 Subordinate apparatus
60 User apparatus
211 Optical interface
212 Signal processing unit
221 Optical interface
222 Signal processing unit
231 Signal distributing unit
232 Signal concentrating unit
41 First optical meter
42 Second optical meter
43 First session establishing unit
44 Second session establishing unit
45 Optical switch
46 Control unit
47 Signal processing unit
48 Communication unit

The invention claimed is:

1. A communication system for a passive optical network, comprising:
    an OLT system including a first OLT (Optical Line Terminal) and a second OLT, the first and second OLTs being configured to output first and second downstream optical signals to first and second ends of a trunk communication line, respectively, the trunk communication line being divided into a plurality of line sections by a plurality of splitters, the first OLT being connected to the second OLT via the plurality of line sections and the plurality of splitters, the plurality of line sections and the plurality of splitters being connected one another in series; and
    a plurality of ONU (Optical Network Unit) systems optically connected to the plurality of splitters at an upstream side and electrically connected to a plurality of subordinate devices at a downstream side, respectively, each of the plurality of ONU systems including:
        a first session establishing interface configured to establish a session with the first OLT via one of the plurality of splitters, the first session establishing interface passing the first downstream optical signal therethrough once the session is established;
        a second session establishing interface configured to establish a session with the second OLT via the one of the plurality of splitters, the second session establishing interface passing the second downstream optical signal therethrough once the session is established; and
        an ONU configured to:
            receive one of the first and second downstream optical signals;
            convert the one of the first and second downstream optical signals into a downstream electric signal and provide the downstream electric signal to one of the plurality of subordinate devices; and
            convert an upstream electric signal from the one of the plurality of subordinate devices into an upstream optical signal and provide the upstream optical signal to one of the first and second OLTs via one of the first and second session establishing interfaces and the one of the plurality of splitters,
    wherein each of the plurality of splitters is configured to distribute one of the first and second downstream optical signals to the ONU connected to the each of the plurality of splitters and either another of the plurality of splitters or one of the first and second OLTs, and
    each of the plurality of splitters is configured to:
        output the first downstream optical signal to the ONU connected to the each of the plurality of splitters via a first path; and
        output the second downstream optical signal to the ONU connected to the each of the plurality of splitters via a second path different from the first path.

2. The communication system according to claim 1, wherein each of the plurality of ONU systems further includes:
    an optical switch configured to receive the first and second downstream optical signals from the first and second session establishing interfaces; and
    a control circuit configured to:
        cause the optical switch to select one of the first and second downstream optical signals based on a predetermined criterion; and cause the optical switch to output the selected one of the first and second downstream optical signals to the ONU.

3. The communication system according to claim 2, wherein the control circuit is configured to cause the optical switch to select the one of the first and second downstream optical signals based on light intensity information of the first and second downstream optical signals as the predetermined criterion.

4. The communication system according to claim 2, wherein the control circuit is configured to cause the optical switch to select the one of the first and second downstream optical signals based on communication delay information of the first and second downstream optical signals as the predetermined criterion.

5. The communication system according to claim 3, wherein each of the plurality of ONU systems further includes:
   a first optical meter configured to detect a first light intensity of the first downstream optical signal and provide the first light intensity to the control circuit, and the first optical meter is located between the first session establishing interface and one of the plurality of splitters connected to the each of the plurality of ONU systems; and
   a second optical meter configured to detect a second light intensity of the second downstream optical signal and provide the second light intensity to the control circuit, and the second optical meter is located between the second session establishing interface and the one of the plurality of splitters connected to the each of the plurality of ONU systems, and the control circuit is configured to:
   cause the optical switch to select one of the first and second downstream optical signals that has a higher light intensity between the first and second light intensities; and
   cause the optical switch to output the selected one of the first and second downstream optical signals to the ONU.

6. An ONU system assembly comprising:
a plurality of ONU (Optical Network Unit) systems optically connected to a plurality of splitters at an upstream side and electrically connected to a plurality of subordinate devices at a downstream side, respectively, the plurality of ONU systems being optically connected to a first OLT (Optical Line Terminal) and a second OLT via the plurality of splitters, the first and second OLTs being configured to output first and second downstream optical signals to first and second ends of a trunk communication line, respectively, the trunk communication line being divided into a plurality of line sections by the plurality of splitters, the first OLT being connected to the second OLT via the plurality of line sections and the plurality of splitters, the plurality of line sections and the plurality of splitters being connected one another in series, each of the plurality of ONU systems including:
   a first session establishing interface configured to establish a session with the first OLT via one of the plurality of splitters, the first session establishing interface passing the first downstream optical signal therethrough once the session is established;
   a second session establishing interface configured to establish a session with the second OLT via the one of the plurality of splitters, the second session establishing interface passing the second downstream optical signal therethrough once the session is established; and
   an ONU configured to:
      receive one of the first and second downstream optical signals;
      convert the one of the first and second downstream optical signals into a downstream electric signal and provide the downstream electric signal to one of the plurality of subordinate devices; and
      convert an upstream electric signal from the one of the plurality of subordinate devices into an upstream optical signal and provide the upstream optical signal to one of the first and second OLTs via one of the first and second session establishing interfaces and the one of the plurality of splitters,
wherein each of the plurality of splitters is configured to distribute one of the first and second downstream optical signals to the ONU connected to the each of the plurality of splitters and either another of the plurality of splitters or one of the first and second OLTs, and
each of the plurality of splitters is configured to:
   output the first downstream optical signal to the ONU connected to the each of the plurality of splitters via a first path; and
   output the second downstream optical signal to the ONU connected to the each of the plurality of splitters via a second path different from the first path.

7. The ONU system assembly according to claim 6, wherein each of the plurality of ONU systems further includes:
   an optical switch configured to receive the first and second downstream optical signals from the first and second session establishing interfaces; and
   a control circuit configured to:
      cause the optical switch to select one of the first and second downstream optical signals based on a predetermined criterion; and
      cause the optical switch to output the selected one of the first and second downstream optical signals to the ONU.

8. The ONU system assembly according to claim 7, wherein the control circuit is configured to cause the optical switch to select the one of the first and second downstream optical signals based on light intensity information of the first and second downstream optical signals as the predetermined criterion.

9. The ONU system assembly according to claim 7, wherein the control circuit is configured to cause the optical switch to select the one of the first and second downstream optical signals based on communication delay information of the first and second downstream optical signals as the predetermined criterion.

10. The ONU system assembly according to claim 8, wherein each of the plurality of ONU systems further includes:
    a first optical meter configured to detect a first light intensity of the first downstream optical signal and provide the first light intensity to the control circuit, and the first optical meter is located between the first session establishing interface and one of the plurality of splitters connected to the each of the plurality of ONU systems; and
    a second optical meter configured to detect a second light intensity of the second downstream optical signal and provide the second light intensity to the control circuit, and the second optical meter is located between the second session establishing interface and the one of the plurality of splitters connected to the each of the plurality of ONU systems, and the control circuit is configured to:
  cause the optical switch to select one of the first and second downstream optical signals that has a higher light intensity between the first and second light intensities; and
  cause the optical switch to output the selected one of the first and second downstream optical signals to the ONU.

* * * * *